4 Sheets—Sheet 1.

R. D. HUME.

CAN BODY FORMING, SOLDERING, AND HEADING MACHINE.

No. 11,533. Reissued Apr. 21, 1896.

Witnesses,
J. A. Muse
J. D. Aschecks

Inventor,
Robert D. Hume
By Dewey & Co.
Attys

R. D. HUME.

CAN BODY FORMING, SOLDERING, AND HEADING MACHINE.

No. 11,533. Reissued Apr. 21, 1896.

Witnesses,
J. H. Nurse
F. T. Cochock

Inventor,
Robert D. Hume
By Dewey & Co.
Attys

R. D. HUME.

CAN BODY FORMING, SOLDERING, AND HEADING MACHINE.

No. 11,533. Reissued Apr. 21, 1896.

Witnesses,
C. E. Morse
H. F. Ashrock

Inventor,
Robert D. Hume
By Dewey & Co.
Attys

R. D. HUME.

CAN BODY FORMING, SOLDERING, AND HEADING MACHINE.

No. 11,533. Reissued Apr. 21, 1896.

Witnesses,
S. H. Mure
H. F. Aschick

Inventor
Robert D. Hume
By Dewey & Co.
Attys

UNITED STATES PATENT OFFICE.

ROBERT D. HUME, OF GOLD BEACH, OREGON.

CAN-BODY FORMING, SOLDERING, AND HEADING MACHINE.

SPECIFICATION forming part of Reissued Letters Patent No. 11,533, dated April 21, 1896.

Original No. 506,878, dated October 17, 1893. Application for reissue filed April 16, 1894. Serial No. 507,797.

*To all whom it may concern:*

Be it known that I, ROBERT D. HUME, a citizen of the United States, residing at Gold Beach, Curry county, State of Oregon, have invented an Improvement in Can-Body Forming, Soldering, and Heading Machines; and I hereby declare the following to be a full, clear, and exact description of the same.

My invention relates to the manufacture of sheet-metal cans; and it consists in an organized machine of peculiar construction capable of forming tubular can-bodies from flat sheets of metal, side seaming said bodies, soldering such side seams, and then heading the side-seamed and soldered body.

My invention is also embodied in special forms or constructions of the blank-cutting devices, of the side-seaming mechanism, of the seam-soldering mechanism, of the heading mechanism, and of the former or horn which extends or is prolonged throughout the machine from the blank-feeding mechanism to the heading mechanism, around which horn the can-bodies are wrapped and along which they are moved in proximity to the successive mechanisms which complete the body, such bodies being taken from the horn directly to the heading mechanism.

Figures 1, 2:
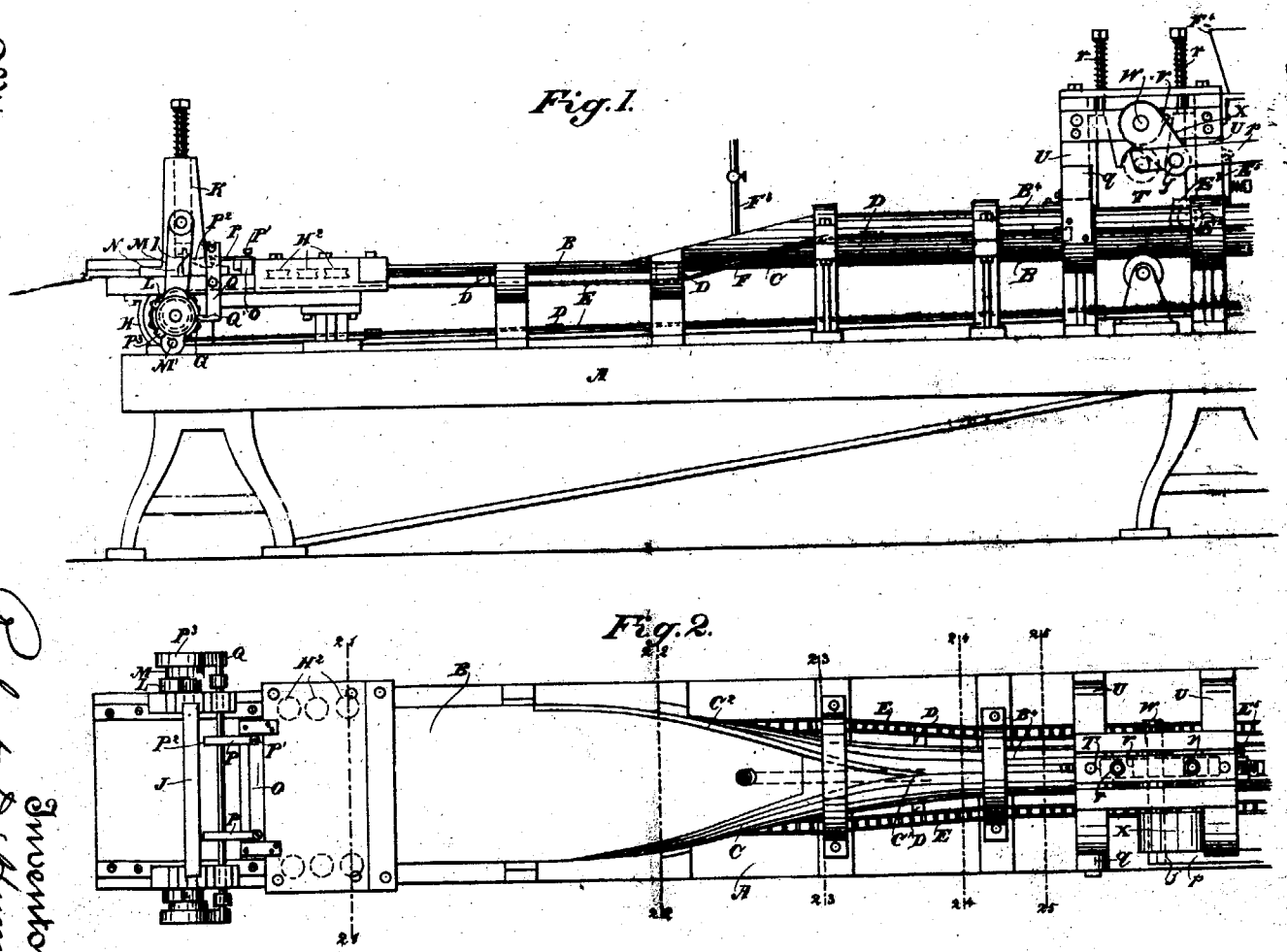
Figure 1:
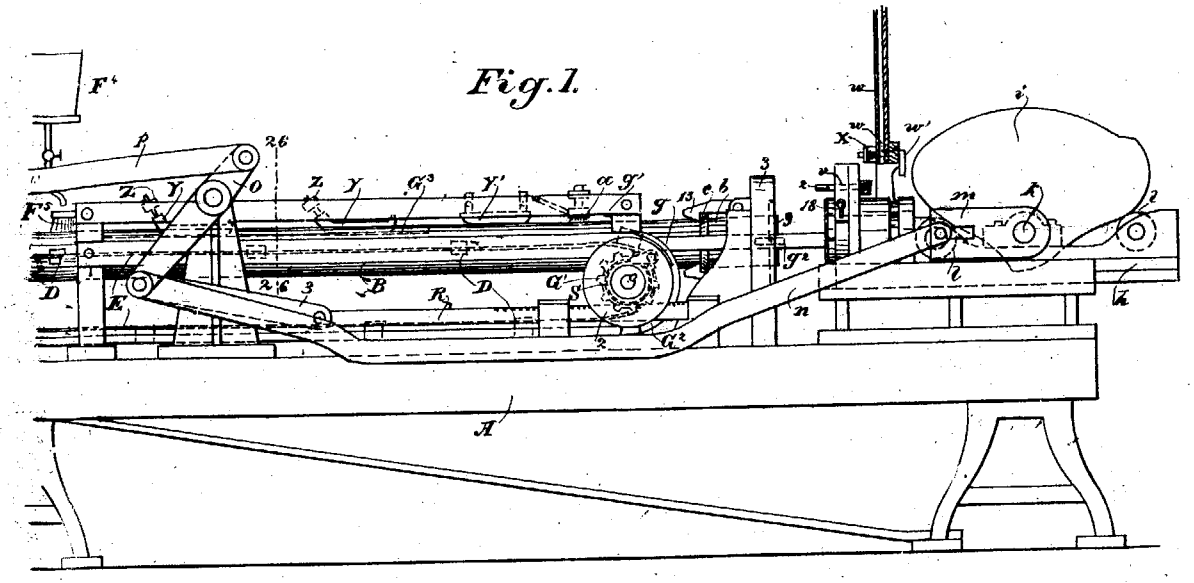
Figure 2:
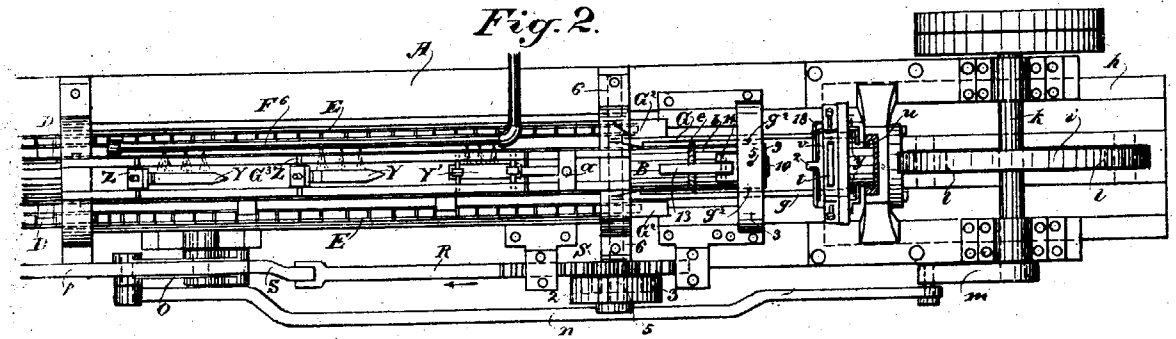
Figure 3:
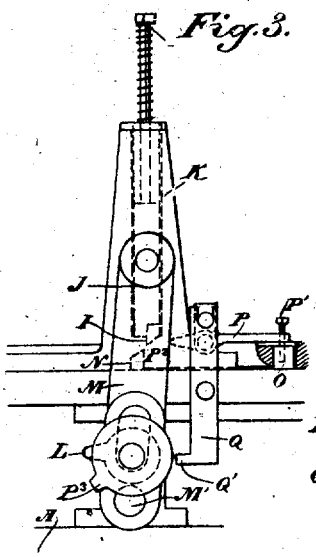
Figure 4:
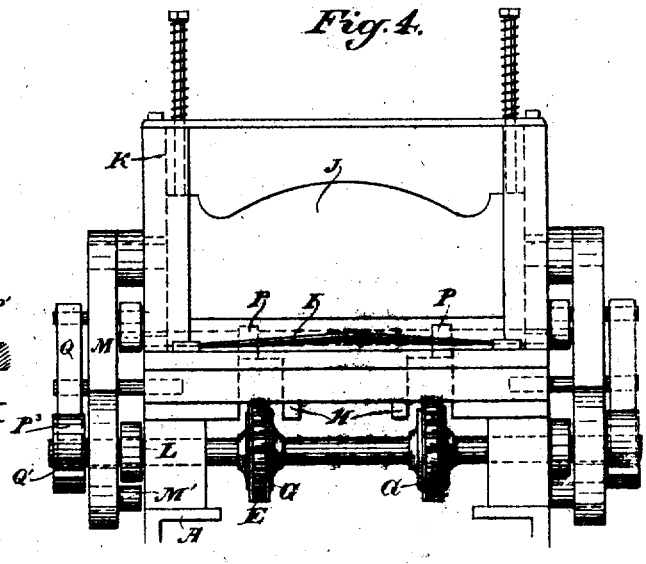
Figure 5:
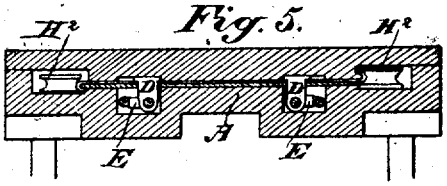
Figure 10:
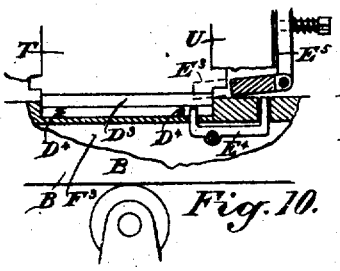
Figure 11:
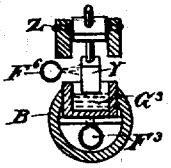
Figure 12:
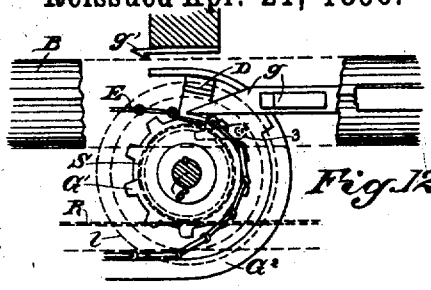
Figure 20:
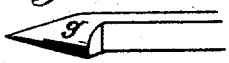
Figure 13:
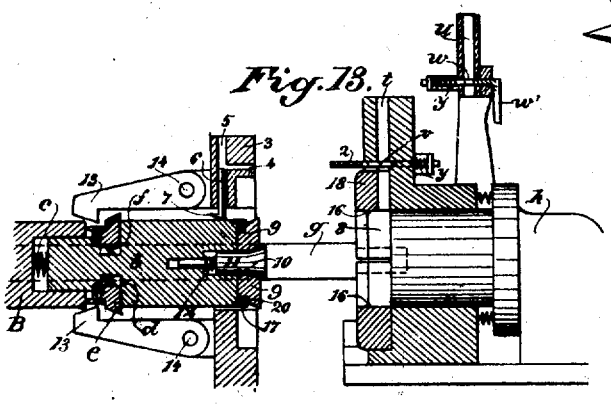
Figure 14:
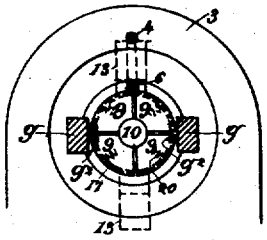
Figure 15:
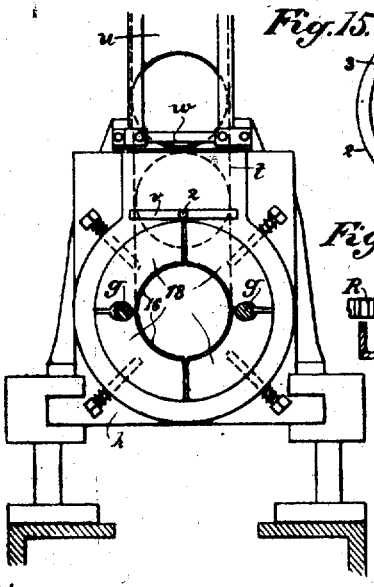
Figure 18:
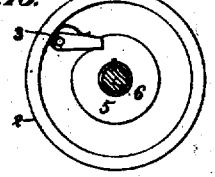
Figure 16:
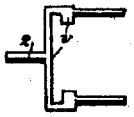
Figure 19:
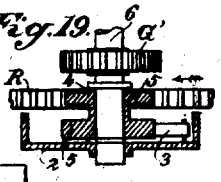
Figure 17:
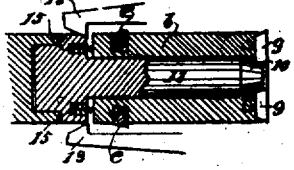

Figure 1, Sheets 1 and 2, is a side elevation of my machine. Fig. 2, Sheets 1 and 2, is a plan view of the same. Fig. 3 is an enlarged side view of the cutting mechanism. Fig. 4 is an end view of the same. Figs. 5, 6, 7, 8, and 9 are cross-sections on the respective dotted lines 21 22 23 24 25 of Fig. 2. Fig. 10 is a detail view of the pressing device with its connections. Fig. 11 is a cross-section on the line 26 of Fig. 1, Sheet 2. Fig. 12 is an enlarged view of that part of the machine where the return of the chain and carriers takes place and the heading and crimping commences. Fig. 13 is a vertical longitudinal section through the heading and crimping device. Fig. 14 is an end view of the head of the cylinder which carries the can-bodies to be headed. Fig. 15 is a similar view of the reciprocating can-head carrier. Fig. 16 is a detail view of the plate *v*. Fig. 17 shows a modification of the cylinder *b*. Figs. 18, 19, and 20 are details to be referred to. Fig. 18 being a reverse view.

The object of this invention is by a single continuous operation to take sheets of metal, cut them into the proper lengths, form the hooks upon the edges, shape the sheets into a cylindrical form, lock the edges and close and solder the seam, place a head upon the finished body, and crimp it thereon.

Upon a suitable framework or support A is mounted a former B, which may be of cast metal or other suitable material. The rear end of this former is nearly flat, being curved upward a little at the outer edges, and from this the curvature gradually increases until at a point sufficiently distant from the receiving end the sides have been drawn together until they form a cylindrical horn, around which the sheet of metal has been wrapped by its gradual advance from the rear end of the former to its cylindrical portion. Exterior to this former is a casing of metal C, which is correspondingly shaped at the rear end and gradually curved toward the front until it is closed around the former, as shown at C′, forming an annular channel around the horn, within which the tubular sheet of metal is contained. This casing C is supported at such a distance from the lower and outer sides of the former B as to leave sufficient space for the passage of the sheet of metal between it and the former B.

The sheet of metal out of which the tubular can or other article is made is advanced between the former B and casing C by means of carriers D, the lower ends of which are hinged to the chain-links E, as shown, and the upper ends project through slots F in the casing C and travel within corresponding guide-channels in the lower part of the former B. These channels and the corresponding slots in the casing are gradually carried up around the sides of the former B and the exterior casing as the latter are drawn together to approach the cylindrical form until, when the cylindrical form is complete, these carriers stand upon the opposite sides of the cylindrical horn. In order to allow these carriers to gradually change their position as they move over this space, they are loosely hinged to the inner sides of the links of which the carrying-chain is composed, as plainly shown in Figs. 5, 6, and 7, and they are thus allowed to turn about these links from an approximately vertical to a horizontal position, thus presenting their carrying edges against the edge of the sheet of metal, so as to advance the latter continuously from the time it enters the apparatus until it is discharged at the opposite end. The chains which move the carriers pass around sprocket-wheels G and G′ at opposite ends of the apparatus. There is one of these chains upon each side of the apparatus, and they pass around the sprocket-wheels G within the curved inclosing-bands H, which form extensions of the casing C, and the spaces between the bands are made by widening the guide-slots in the casing to allow the carrier-heads to enter the slots as they come up around the pulleys G.

Before the horizontal table formed by the rear end of the casing C is fixed a cutter, which consists of a cutting or shearing blade I, fixed to the cross-head J, which slides in vertical guides in the standards K, which are fixed upon each side of the machine, as shown. The cutting edge of the blade I is made concave, as shown, so that it cuts from the edges of the sheet toward the center.

Upon the ends of the shaft which carry the chain sprocket-wheels G are fixed the cams L, and the ends of the shaft extend through slots in the lower ends of the connecting-rods M, which extend upward and take hold of pins projecting through the slots in the standard from each side of the cross-head. From the lower ends of the connecting-rods project pins M′, which are engaged by the cams at each rotation of the shaft, and the cutter-blade is thus drawn down. The ends of the shaft entering the slots in the connecting-rods serve as guides for the latter as they reciprocate.

N is the opposite blade against which the movable cutter acts, and this is fixed upon the bed of the machine.

O is a stop against which the edge of the sheet of metal is arrested when the sheet is moved beneath the cutter, and this insures its being cut off to the proper length for the article to be made. These stops are connected with the ends of arms P by screws P′, which allow the arms a little independent movement. These arms P are connected with oscillating levers Q, fulcrumed to the frame or bed-plate and having projections Q′, which are engaged by the cams $P^3$ at the proper instant to tilt the levers and lift the stops O, so that the sheet of metal may pass onto the former after it has been cut off. The lever Q is tilted just as the sheet has been cut, and this movement causes the points $P^2$ to descend and hold the edge of the sheet near the cutter until the latter has risen, after which the opposite ends of the levers P will have risen, so as to strike the screw-heads P′ and lift the stop O. At the instant the stops are moved the sheet is taken by the carriers and moved forward into that portion of the apparatus which forms the hooks upon the opposite edges of the sheet to be afterward united to form the seam when the sheet has been bent into a tubular form. These edges are turned over by a mechanism consisting of flanged rollers $H^3$, which I do not further describe, as they form no part of the present invention.

The shaft 6 carries on its outer end the inwardly-flanged case 2, and to the latter is attached the pawl 3. (See Figs. 18 and 19.) A short sleeve 4 is loosely mounted upon the shaft and carries the pinion S and also the disk 5, with a notch in its periphery with which the pawl 3 engages. Now as the rack-bar R moves in the direction of the arrow, Fig. 2, the pinion will revolve, and with it the disk 5, so that the notch in it will be engaged by the pawl 3, and consequently rotate shaft 6, and with it the sprocket-pulleys G′, and therefore the chain also; but when the rack-bar recedes the pinion S will turn in the opposite direction, and consequently the pawl 3 will slip over the notch in the disk 5 and the case 2 and shaft 6 remain then unmoved.

The sheet of metal is carried along by the carriers upon the chain by an intermittent motion produced by a pawl-and-ratchet mechanism connected with the shaft of the sprocket-wheels G′ and operated by a reciprocating rack-bar R, the teeth of which engage with the teeth of a gear-wheel S, turning loosely upon the sprocket-wheel shaft, so that when the rack-bar reciprocates in one direction it has no effect except to rotate the gear-wheel; but when it is reciprocated in the opposite direction the pawl or clutch mechanism between the gear-wheel and the sprocket-wheel shaft will become engaged, so that the latter will be rotated and the carrying-chain will be advanced a certain distance. These intermittent movements are of a length equal to the distance which the sheet is to be moved for each successive operation, as in the commencement, after the sheet has been cut, it is moved forward sufficiently to leave room for a second sheet of metal to be introduced beneath the cutters, and after it has passed between the rollers which form the hooks it is advanced along the former B and between it and the exterior casing C until it reaches the seam-closing device.

Figure 6:
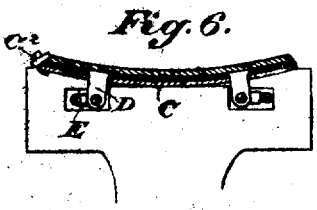

Upon one side the turned-over edge of the metal sheet clasps the edge of the casing C and moves between it and a guide $C^2$, as shown in the section, Fig. 6. This retains the sheet in its proper position as it is carried along the former and gradually turned into a cylindrical shape, and prevents its being moved to either side and the seam in the wrong position when closed.

Figure 7:
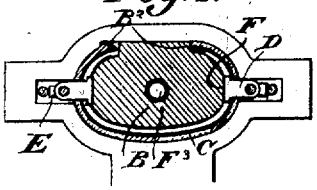
Figure 8:
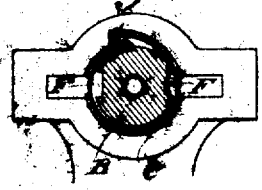
Figure 9:
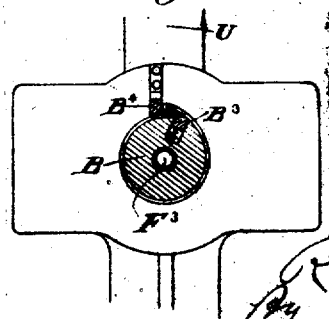

In Fig. 7 the former B and casing are shown approaching the cylindrical shape, and the former B has concavities $B^2$ made upon each side at the top, which is shown as flattened or slightly convex. The turned-over edges of the metal sheet are pressed into these concavities by the exterior casing, and the space between them becomes narrower as the can progresses until the concavity upon the left side becomes merged into the cylindrical outline which the former has assumed at this point. This allows the inwardly-curved hook (upon the right edge of the metal sheet, as here shown) to overlap the outwardly-curved hook of the metal sheet which still remains in the concavity upon that side of the horn, and the edges are thus interlocked. Beyond this point is a yielding stop $B^3$, set into a channel in the top of the cylindrical horn, (which shape the former has now assumed.) This stop is forced outward by interior springs, as shown, so that the inner edge of the seam abuts against it. The outer edge of the seam is pressed in and the two parts closely interlocked by the bar or stop $B^4$, which is fixed at an inclination with the part $B^3$, and as the can passes between the two the two parts of the seam are forced closely together.

When the hook edges of the sheet of metal have been brought together and overlapped and caused to engage with each other, they pass beneath a pressure-plate T, which moves in vertical guides U and is forced down by the action of a cam V, mounted upon a shaft W, having a crank X, fixed upon one end of it, so that by the oscillation of this crank the cam V is caused to act upon the vertically-moving pressure-plate at the instant when the can which has been closed around the cylindrical horn is beneath the plate with its seam uppermost.

$D^3$ is a vertically-moving plate fitting into a groove or channel in the top of the horn just beneath the seam-closer T. Springs $D^4$ beneath this plate allow it to be depressed when the seam is closed, so that the overlapping thickened parts forming the seam of the can are forced inward and the exterior of the can is left perfectly smooth.

$E^3$ is an arm fulcrumed, as shown, so that one end drops down in front of the approaching can when the latter is moved beneath the seam-closer. The end of this arm acts as a stop against which the ends of the meeting sides are made even just before the seam is closed by the plate T.

Beneath the movable plate $D^3$ is a bent U-shaped arm $E^4$, so fulcrumed that one end lies beneath the plate $D^3$ and the other beneath the arm $E^3$, so that when the plate $D^3$ is depressed by the action of closing the seam it tilts the lever $E^4$ and through its movement lifts the stop $E^3$ to allow the can-body to be advanced by the next movement of the carriers. The stop $E^3$ is hinged to a spring-actuated swinging arm $E^5$, so that as the approaching can strikes it the stop yields and moves back; but the spring exerts sufficient pressure to even up the ends of the can-body.

The pressure of the plate T closes the seam firmly, after which the can is allowed to move out from beneath the pressure-plate, and thence passes along the cylindrical horn, with the seam vertically above the solder bath, which is formed by a tank $G^3$, fitting in a groove or channel in the extension of the horn. This tank is filled with solder, which is kept in a melted condition by gas-jets from a tube $F^3$, extending through the hollow horn, as shown.

$F^4$ is an acid-tank with a conducting-pipe which delivers acid to a brush $F^5$, by which it is applied to the seams as the cans pass beneath it.

The soldering-irons Y are supported by arms Z, pivoted to a frame above the horn and solder bath in such a manner that when the can passes along the horn beneath these irons the irons, by reason of the inclined ends, are lifted up out of the solder, and as the seam passes beneath them the solder is deposited thereon. The last iron Y′ is termed the "sweating-iron," and the cans make a periodical stop beneath it, so that the solder is thoroughly melted or sweated into the joint and the exterior surface left smooth. The irons are heated by supplemental gas-jets $F^6$, which are applied to the sides of the irons. After leaving the solder bath the seam passes beneath a brush *a*, which wipes off any surplus solder, and the cans then pass to the end of the horn, where the final operation of placing the heads upon them is completed.

*b* is a cylinder in line with the end of the horn and so supported as to reciprocate slightly to and from it. In the present case I have shown the end of the horn chambered, and the corresponding end of the cylinder *b* is turned down small enough to enter this chamber, within which it is guided.

*c* is a spring against which the inner end of the cylinder rests, and which is compressed when the cylinder is forced inward and acts, as soon as the cylinder is released, to force it outward again.

A groove or channel *d* is made around the cylinder just outside the end of the horn, and in this groove or channel is fitted a collar *e*, composed of sections which allow the collar to be compressed or made smaller and afterward expanded. Inside of the sections of the collar are placed spirial springs *f*, which serve to force the sections of the collar outwardly. These collars have small shoulders which engage corresponding flanges or screw-heads on the tubular end of the horn, and thus prevent the sections from being forced outward beyond a certain distance. The outer periphery of the sections *e* is made beveled or inclined, as shown, so that when the collar is in its normal position, forced out by the springs, the edge of the sections which is toward the horn and the approaching can is just flush with the end of the horn, while the opposite edge of the sections is of as much larger diameter as the thickness of the can-body. For this reason, when the can-body is moved along so as to pass off the end of the horn, it slides over the sections *e*, and by reason of the springs beneath them they are compressed or forced toward the center, so that the can will pass over the largest diameter of the sectional collar, and as soon as the can has passed this collar the sections are thrown out again, so as to present an abutment against which the rear end of the can rests and which will prevent the can from being forced backward by future operation. The can-body is moved from the end of the horn, where it is left by the carriers, upon this cylinder *b* by means of hooks *g*, the ends of which are beveled, as shown, so that the can-body can pass beneath them without catching, and the can-body is prevented from slipping backward while these hooks are moving over its surface by other stop-hooks *g'*. The inner sides of the hooks are vertical, so that they will engage the rear edge of the can-body and move it forward as the hooks reciprocate. The shanks of the hooks are attached to a sliding reciprocating carrier *h*, which is reciprocated for purposes to be hereinafter described, and the hooks *g* project upon each side of the horn, as shown plainly in the plan view, Fig. 2. The upper sides of the points of these hooks are also beveled off, (see Fig. 20,) so as to make them incline outwardly from the points of the hooks toward the shoulder, which catches the rear of the can, and these beveled points pass under the carriers D as each pair successively arrives at that point and turns them from their previous horizontal position into a vertical position, in which condition they pass around the sprocket-wheels G' inside the curved guides $G^2$, and thence return along the lower part of the machine to the beginning, where they are in position to take another flat sheet of metal and carry it along through the various operations.

The movable carriage *h* is actuated by a cam *i*, fixed upon the driving-shaft *k* of the machine, and when this cam strikes the rollers *l*, which are journaled upon the carriage, it moves the carriage first forward toward the end of the cylinder *b* and then returns it again. Upon the end of the driving-shaft *k* is a crank *m*, and a connecting-rod *n* extends from this crank and connects with an oscillating lever *o*, fulcrumed upon the frame above the soldering portion of the apparatus, as shown.

From the upper part of the lever *o* a connecting-rod *p* extends to a pin *j* on the crank X and has a notch made in the lower end of it, which engages this crank-pin, so that when the lever is oscillated to push the connecting-rod *p* it moves the crank-arm X and, through the cam V, acts, as before described, to force the presser-plate T down and close the seam. At the instant when this is finished the end of the connecting-rod *p* forms contact with a stationary lug *q*, which lifts it from the crank-pin, and the crank is then returned to its former position and the presser-plate is lifted by means of the springs *r*, surrounding vertical pins, which connect with the presser-plate and through which the springs act to raise the latter and return the crank as soon as released. From the pin on the lower end of the lever *o* a connecting-rod *s* extends to the rack-bar R and thus reciprocates this rack-bar to produce the intermittent motion of the parts previously described.

The carriage *h*, which, as previously described, is caused to reciprocate to and from the end of the cylinder *b*, has a slot or channel *t* in the upper part of the portion nearest to the end of the cylinder *b*. This slot or channel is of sufficient width and diameter to receive a can-cover, and whenever the carriage is drawn back into line with the chute *u*, by which the can-covers are brought to this carriage, one of the covers is allowed to fall into the slot *t* within the carriage. It is retained in this place by means of a reciprocating slotted plate *b*, and the remaining covers are retained in the chute by means of a corresponding reciprocating slotted plate *w*, extending across the bottom of the chute. This plate has an arm *w'*, projecting downward in such position that when the carrier *h* is moved in that direction it forms contact with this arm *w'*, and this moves the plate *w*, so that when the slot *t* is directly under the chute *u* the slide *w* will have been moved sufficient to allow one cover to pass from the chute *u* into the carrier-slot *t*. As the carrier *h* moves away, the slide *w* is returned to its normal position by a spring *x* and closes the bottom of the chute. The slide *v* on the carrier is correspondingly retained in a closed position by a spring *y*. A pin 2 extends from the slide *v* toward the stationary guide-standard 3, through which the end of the cylinder *b* passes. This standard has a hole 4 made in it, into which the end of the pin 2 passes, and when there is no can-body in position upon the cylinder *b* this pin will continue to reciprocate into and out of the hole 4 without moving the slide *v* or dropping the head which is in the slot *t*. A second hole 5 is made vertically through the rear portion of the standard 3 and crossing the hole 4. In the hole 5 is a stem 6, having at the lower end an inclined wedge-shaped projection 7, the point of which is presented toward an approaching can. The lower part of the wedge rests normally in a depression in the top of the cylinder *b*, having the point high enough to allow the edge of an advancing can to pass beneath it. When the can slides from the horn upon the cylinder *b*, it passes directly beneath the wedge-shaped point 7 and lifts the pin 6 up until it is in line with the hole 4. The next reciprocation of the carrier *h* causes the pin 2 to enter the hole 4. The end of the pin will come in contact with the pin 6, which then stands across the hole 4, and when this occurs the slide *v* will be moved until a slot in it of equal diameter with the slot *t* is brought into line with the latter. This allows the can-head to slip down into the cylindrical chamber 8 between the spring-actuated segmental sections 18, which correspond in position with the end of the cylinder *b*, and which are fitted into the end of the carrier *h* and project therefrom, as shown. The projecting ends of these sections are beveled, so that when advanced by the carrier *h* sufficiently to enter the circular recess in the face of the standard 3 and surrounding the outer end of the cylinder *b* they will be forced to approach each other and contract the opening within which the can-head is contained. Upon the end of this cylinder *b*, and secured in place by any well-known means, are a number of segments 9, forming a complete circular disk. In the present case I have shown four of these segments; but any suitable number which will perform the work may be employed. The outer periphery of these segments is made beveling, so that the diameter of the outer face is greater than the diameter of the end which is adjacent to the end of the cylinder *b*, against which the sectional disk lies. When in its normal position, the cylinder *b* is advanced, so that these segments are projected a little beyond the face of the standard 3, and consequently the edge of the can-head which is between the segments 18 will, when these segments are advanced, be slipped over the ends of the segments 9 before the segments 18 are closed together, and will then be partially closed or crimped in by the action of the inwardly-projecting V-shaped rings or flanges 16 interior to the segments 18. Through the center, between the segments 9, is made a tapering opening, within which is fixed a conical head 10. The taper of the opening and of the head may be in either direction, the operation being essentially the same in both cases.

In the case which I will first describe I have shown the cone 10 with the larger end toward the reciprocating carrier *h*. It has a cylindrical extension 11, which enters a corresponding hole made in the end of the cylinder *b*. This hole is deep enough to contain a spiral spring 12, by which the head 10 is normally forced outward, so as to allow the sections 9 of the conical disk to remain of a diameter approximately equal to that of the head of the cylinder *b*, and in this position they are smaller than the interior diameter of the flange of the cap or head which is to be placed upon the can and which is now contained in the cylindrical chamber 8 of the segments 18. The head is dropped from the slot *t*, as previously described, while the segments 18 are moving toward the cylinder *b* and its sectional disk 9, and this movement is continued, so that the can-head which has dropped into the chamber 8 is immediately carried on over the sectional disk 9, and the further movement of the carrier *h* forces the end of the can-head and the back of the chamber, against which the can-head rests, against the end of the cone 10, thus forcing the cone to slide inwardly by reason of the chamber in which extension 11 slides, and the movement of the cone 10 forces the conical segments 9 outwardly within the end of the can, thus spreading the end of the can while the projectings rings 16 in the interior of the segments 18, within which the can-head is held during this movement, correspondingly compress the edges of the can-head, so as to crimp it upon the end of the can.

13 are hooks fulcrumed to the standard 3 upon pins, as shown at 14. These hooks are so beveled toward the horn that the approaching can lifts them and is allowed to pass between them and over the compressible sections *e*, so that its rear edge abuts against the faces of these sections. The points of the hooks 13 will have dropped down behind the sections *e*, and will thus hold them firmly against the pressure caused when the head is placed upon the opposite end of the can and crimped thereon. The groove or channel in which the sections *e* are fitted is a little wider than the thickness of the sections, so as to allow them to yield slightly when the pressure is brought upon them until the pressure is supported by the hooks.

In the second method which I have shown for crimping the head upon the end of the can the central hole between the sections 9 has the enlargement of the conical opening inwardly, and the head 10 is correspondingly coned, with the outer end the smallest, as shown in Fig. 17. In this case, as before, the cylinder *b* has a slight longitudinal movement about the extension 11 of the head 10. In this case the extension 11 abuts solidly against the end of the horn or an intermediate correspondingly-shaped piece, and the cylinder *b* is normally forced a little way from this piece by springs 15. In this case the segments *e*, against which the rear end of the can is supported, are fitted into a groove in the cylinder *b*, as before described; but the hooks 13 engage the rear of the cylinder *b* and support it when the head is crimped upon the can. The operation in other respects is the same as previously described. When the can-head is moved so as to fit over the end of the can and the segments 9, the further movement of the carrier *h* pushes the cylinder *b* back, and with it the disks 9, and the disks are expanded within the end of the can by this movement of the cylinder *b*, which causes the head 10 to expand the disks, as previously described. When this movement has been completed and the can-head is firmly crimped upon the end of the can, the first backward movement of the carrier *h* withdraws the can by reason of the secondary hooks $g^2$, fixed upon the shanks of the hooks *g* in such a position as to engage the slightly-projecting rear rim of the can, and thus draw the can away from the cylinder *b*. This relieves the segments 9 from the pressure of the cone 10 and allows them to assume a normal position of smaller diameter than the interior of the can, and the latter thus slides freely off the end of the cylinder and is discharged, while the next can takes its place, and the work proceeds.

In order to prevent the segments 9 from falling apart, and in order to contract them to their smallest diameter when relieved from the pressure of the cone 10, they are surrounded by a ring 17, Fig. 13, and between this ring and the reduced portion at the inner ends of the segments is a spring or springs 20, which yield to allow the segments to be forced out by the cone 10 and which act to contract the segments when they are relieved from the pressure of the cone.

Having thus described my invention, what I claim as new, and desire to secure by Letters Patent, is—

1. In a can-making machine, and in combination with blank-cutting mechanism, blank feeding or delivering mechanism, and can-heading mechanism; a body former or horn upon which such blanks are delivered, such former or horn being prolonged to the heading mechanism and forming a continuous guide for the can-bodies; and means for moving such can-bodies along the horn, substantially as described.

2. In a can-making machine, the combination with blank-feeding mechanism, can-body-forming mechanism and can-heading mechanism, of a horn extending from the body-forming mechanism to the heading mechanism and means for moving can-bodies along such horn to the heading mechanism, substantially as described.

3. In a can-making machine the combination with blank-feeding mechanism and can-heading mechanism of a can-body former, adapted to receive the blanks from the feeding mechanism, such former being prolonged to the heading mechanism to form a guide for can-bodies, and means for moving such can-bodies along the former and for transferring them to the heading mechanism, substantially as described.

4. In a machine for forming and heading can-bodies, the combination with blank-feeding mechanism and with can-heading mechanism, of a prolonged body former or horn which receives the blanks from the feeding mechanism and along which the can-bodies are moved to the heading mechanism, and side-seaming and seam-soldering devices in proximity to the horn between the blank-feeding mechanism and the heading mechanism, substantially as described.

5. A can-body-making machine, consisting of the forming-plates B and C, between which the sheets of metal are delivered and by which they are formed into cylindrical bodies, carriers by which the plates are moved forward to and through the former, a vertically-reciprocating cutter by which the sheets of metal are cut to the proper lengths, an oscillating stop against which the inner ends of the sheet abut when the cutter descends, and mechanism by which said stops are lifted to allow the sheets to pass as soon as they are released from the cutter, substantially as herein described.

6. In a can-making machine, the forming-plates by which the sheets of metal are shaped into cylinders, carriers by which the sheets are advanced during the process of formation, a vertically-reciprocating cutter, and mechanism by which it is actuated whereby the sheets are cut when passing beneath it, oscillating stops adapted to arrest the edge of the sheet of metal when it is introduced, whereby the proper length is cut off, a cam mechanism by which said stops are raised as soon as the sheet has been severed, and carriers adapted to engage the rear edges of the sheets and advance them into the can-forming mechanism, substantially as herein described.

7. In a can-making machine, a means for severing the sheets into proper lengths, a stop for arresting the sheets before the severing devices operate, means for operating the stop and releasing the sheets after being severed, carriers for advancing the severed sheets forward, and forming-plates between which the severed sheets are delivered by the carriers and formed into body form.

8. In a can-making machine, the forming-plates between which the sheets of metal are delivered and formed into cylindrical bodies, means forming the edges of the sheets into hooks adapted to interlock with each other, means for closing the seam, consisting of a vertically-moving presser-plate, a cam and connecting mechanism for forcing the plate downward on the seam after the parts are interlocked, and springs actuated by the presser-plate and raising the latter after the pressing of the seam has been accomplished.

9. In a can-body-forming machine, mechanism by which the cylindrical body is formed from the flat sheet, a presser by which the seam formed by the interlocking of the edges of the can is closed, a cam mounted upon a shaft adapted to act upon the presser to close the seam, a crank-arm fixed upon the cam-shaft, a reciprocating rod having a hook at the end engaging the crank-pin of said crank whereby the crank is moved in the direction to force the presser downward and compress the seam, a tripping mechanism whereby the reciprocating arm is disengaged from the crank-pin after the seam is closed, and springs whereby the presser is raised and the crank returned after its release from its actuating-arm, substantially as herein described.

10. A can-making machine consisting of the body-former, a seam-closing mechanism, carriers mounted upon endless chains whereby the metal sheets and the completed can-bodies are moved from one end of the apparatus to the other, sprocket-wheels around which said chains pass, and shafts upon which the sprocket-wheels are fixed, a pawl-and-ratchet mechanism and a reciprocating rack whereby this mechanism is actuated and the chains moved and can-bodies advanced intermittently, substantially as herein described.

11. A can-making machine consisting of the cutting and feeding mechanism for the sheets, the former by which the sheets are given a cylindrical shape, and means for closing the seam along the side of the can, a soldering mechanism continuous therewith, a cylinder continuous with the horn over which the can-body passes, mechanism by which the can-body is advanced upon the cylinder, expansible cone-shaped segments adjacent to the end of the cylinder over which the end of the can is passed and retained, a reciprocating carrier and compressible segments moving to and from said cylinder and its segments, a means for delivering a can-head into the carrier-segments whereby it is placed upon the end of the can by the reciprocation of the carrier, and means for expanding the interior segments within the can whereby the head is crimped upon the end of the can, substantially as herein described.

12. In a can-making machine, a cylindrical horn over which the can passes and upon which the seam is closed and soldered consecutively, a cylindrical extension beyond the end of the horn, conical segments *e* fitting a channel in said cylinder with interior springs by which the segments are normally forced outward, a reciprocating carrier movable to and from the end of the cylinder, hooks projecting from said carrier adapted to engage the rear end of the can-body and move it forward over the expansible segments so that its rear end abuts against the ends of said segments after it has passed them, conical segments 9 fitting the end of the cylinder and lying within the outer end of the can after it is in position thereon, a central cone entering an opening between the expansible segments and movable with relation thereto, a means for applying a can-head to the end of the can, and for moving the interior cone whereby the can is expanded within the head and the latter crimped thereon, substantially as herein described.

13. In a can-making machine, the horn upon which the can is formed and carried forward during the process of closing and soldering the seam, a cylinder in line with the end of the horn upon which the cans are delivered successively, conical expansible segments fitting the end of the cylinder over which the outer end of the can extends when it is in place upon the cylinder, a reciprocating chambered carrier having compressible segments and movable in line with the end of the cylinder, and having a groove or channel adapted to receive and contain can-heads, a slotted plate passing across said channel, a spring by which said plate is normally held in position to retain the heads within the carrier, a pin projecting from the plate, a hole in the stationary head within which the end of the can-body is received in and out of which hole the pin reciprocates as the carrier is moved to and from the stationary head, a vertical pin movable in a hole in said stationary head transverse to this hole, said pin being moved upwardly to intercept the pin upon the carrier whenever a can is in position to receive the head, substantially as herein described.

14. In a can-making machine, a cylindrical extension of the horn upon which the can is completed, expansible conical segments fitted to the end of the cylinder over which segments the end of the can-body extends when in position, yielding stops over which the body passes when being delivered upon the cylinder and by which the rear end is retained in position after it is placed, a reciprocating carrier moving to and from said stationary cylinder having a slotted chamber in the upper part adapted to receive the can-heads, and a transversely-moving spring-actuated plate normally held in position to retain a can-head within it, a chute adapted to deliver can-heads to the carrier having the mouth in line above the can-head opening of the carrier when the latter is at the end of its reciprocation in one direction, a sliding stop-plate by which the can-heads are retained in the chute, an arm projecting therefrom and engaged by the carrier as it moves outwardly, whereby the plate is moved to allow the single head to pass into the chamber of the carrier, the chute being closed by the return movement of the plate when the carrier moves away from the chute, substantially as herein described.

15. In a can-making machine, the vertically-reciprocating cutter-rods having slots made in their lower ends, a shaft journaled so that the ends project into the slots, cams fixed upon the shaft, and pins projecting from the lower ends of the slotted arms whereby the arms and cutter are depressed by contact of the cams with the pins and the arms are guided in their vertical movements by the slots made through them, substantially as herein described.

16. In a can-making machine, the vertically-reciprocating cutter and actuating mechanism, in combination with a stop O against which the edge of the sheet of metal is retained while being cut, and an oscillating lever P from one end of which the stop is suspended, and mechanism whereby the opposite end is forced down upon the edge of the plate near the cutter while the cutter is rising, and the opposite end and the stop are subsequently raised to allow the sheet to be carried away to the former, substantially as herein described.

17. In a can-making machine, the former B and the casing C arranged with relation to each other so that the sheet is carried between the two and gradually curved into a cylindrical form after the edges have been bent into a hook shape, and a guide $C^2$ whereby one of the hook edges is held in contact with the corresponding edge of the casing to retain the sheet in proper position as it advances, substantially as herein described.

18. In a can-body-forming machine, the former and the casing between which the sheet of metal is advanced, means for folding the edges of said sheet, and guides beyond the edge-forming devices into which the said edges are received and guided while the sheet is approaching a cylindrical form.

19. In a can-making machine, the former B and casing C between which the sheet of metal is advanced after having its edges formed to interlock, and gradually made to assume a cylindrical shape, the spring-actuated stop $B^3$ movable radially within the cylindrical portion of the former B, and projected so as to act as a stop against which one edge of the interlocking seam abuts, and the exterior stop $B^4$ fixed at an inclination with the opposing movable stop $B^3$, and against which the opposite edge of the seam abuts whereby the latter is closed, substantially as herein described.

20. In a can-making machine, means for closing the interlocked seam, consisting of the vertically-reciprocating presser T, the spring-actuated depression bar or anvil $D^3$ and the stop $E^3$ fulcrumed at one end and having its opposite end adapted to drop down in front of the approaching can to serve as a stop whereby the ends of the can are evened before the seam is closed, substantially as herein described.

21. In a can-making machine, the mechanism for closing the interlocked seam, consisting of the vertically-reciprocating presser, the spring-actuated depression-bar $D^3$ and the stop $E^3$ for evening the ends of the can, in combination with the tilting lever $E^4$ fulcrumed so that one end is engaged by the anvil $D^3$, and the other end engages the stop $E^3$ to lift the latter when the seam is closed and allow the can-body to be advanced, substantially as herein described.

22. In a can-making machine, the cylindrical extension over which the can passes after the seam is closed, a solder-trough and gas heating-jets whereby the solder is melted, soldering-irons having hinged suspending arms whereby the irons normally rest in the solder-trough and are raised by the passage of a can beneath them, so that the solder is deposited along the closed seam, and supplemental heating-jets $F^6$, the flame from which impinges upon the soldering-irons to keep them hot, substantially as herein described.

23. In a can-making machine, the cylindrical extension over which the cans pass after the seams have been closed, a solder-trough removably fitting into the top of the extension with gas-jets for heating and melting the solder therein, soldering-irons supported upon hinged arms above the solder-tank with their lower edges normally dipping into the solder within the tank, said irons being lifted and passed over the seam whenever a can passes beneath them, in combination with the acid-tank $F^4$ and the distributing-brush $F^5$ for applying acid to the seam before the can passes beneath the irons, substantially as herein described.

24. In a can-making machine, the former and casing between which the sheet of metal is passed and shaped into a cylindrical form, mechanism for interlocking and closing the seam, and for subsequently soldering the seam, in combination with endless chains situated upon opposite sides, carriers hinged to the chains with the ends adapted to engage the edges of the sheet of metal and advance it by intermittent movements and subsequently to advance the completed can to the point where the head is applied, in combination with means for turning the carriers into a vertical position and a guide-channel by which they are retained in this position when passing around the sprocket-wheels at the rear end of the machine and returning to the front, substantially as herein described.

25. In a can-making machine, a cylindrical extension upon which the can is delivered after leaving the horn upon which it is completed, a reciprocating carrier adapted to receive the heads and place them upon the ends of the cans when presented and arms connected with the carrier having hooks adapted to engage the edges of the completed cans and advance them to a position where the heads are applied, substantially as herein described.

26. In a can-making machine, a cylindrical extension upon which the cans are delivered after being completed, means for retaining the cans in position upon the extension, conical segments at the outer end of the cylinder, a means whereby said segments are movable outwardly within the end of the can which projects over them, a reciprocating carrier movable to and from the end of the cylinder having compressible segments fitting in the end adjacent to the end of the cylinder, said segments having inwardly-projecting V-shaped rings between which can-heads are delivered periodically and placed upon the ends of the cans when the carrier moves toward the can-heads, and mechanism whereby the interior conical segments are expanded and the exterior segments compressed whereby the head is crimped upon the end of the can, substantially as herein described.

27. In combination with a cylinder in line with the horn of a can-making machine, the expansible segments to be carried by said cylinder, the interior springs, and the ring surrounding the segments and springs.

In witness whereof I have hereunto set my hand.

ROBERT D. HUME.

Witnesses:
S. H. NOURSE,
H. F. ASCHECK.